Specification in this case is not in print.
3442X
Sheet 1. 2 Sheets.
J. S. Eastman.
Straw Cutter.
Patented Jan. 29, 1822.
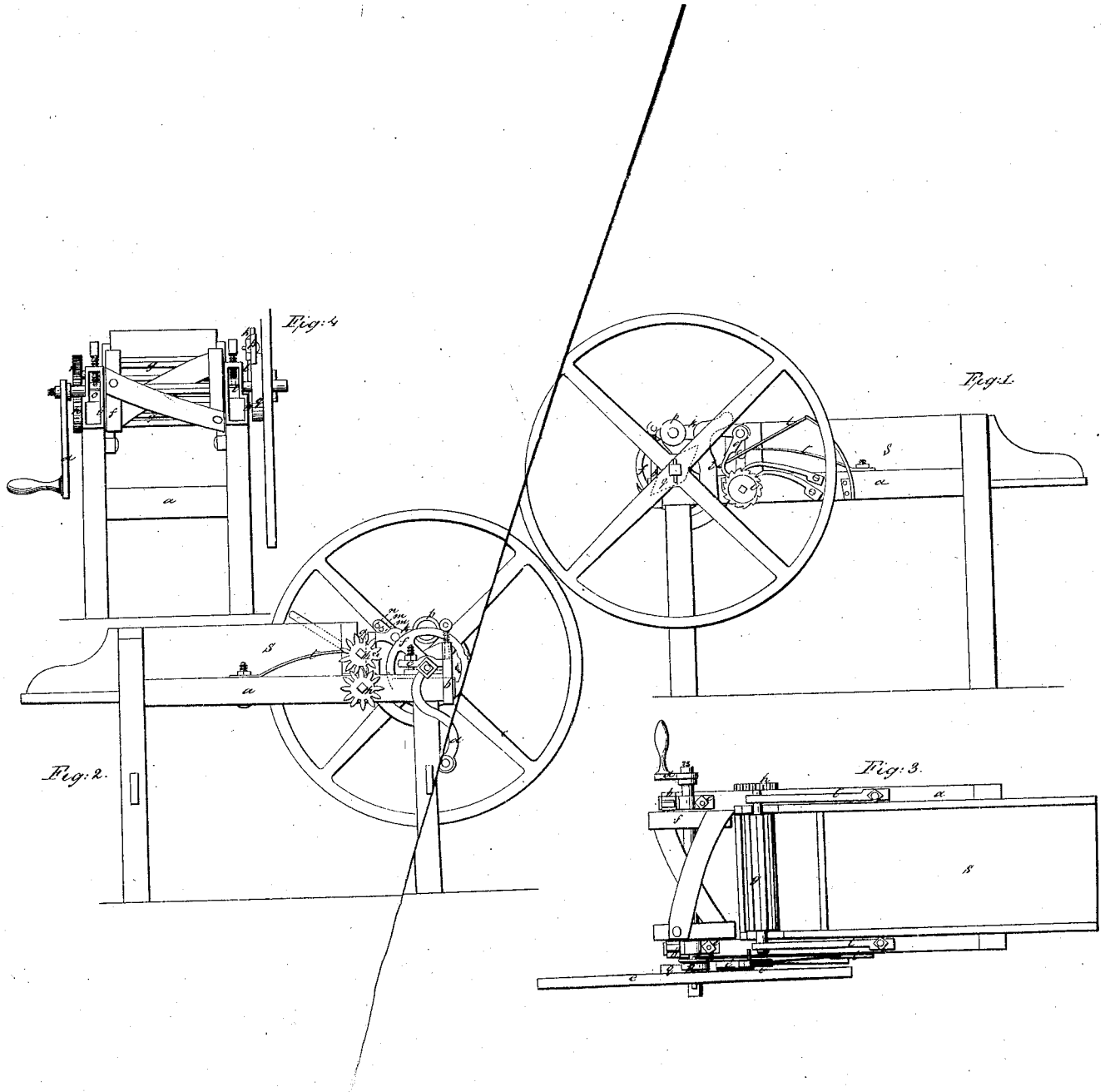
THE NORRIS PETERS CO., WASHINGTON, D. C 3442X
Sheet 2 - 2 Sheets.
J. S. Eastman.
Straw Cutter.
Patented Jan. 29, 1822.
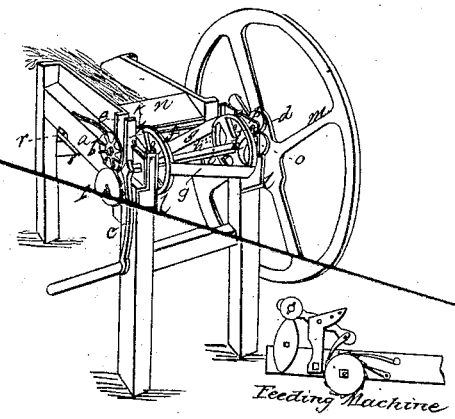
THE NORRIS PETERS CO., WASHINGTON, D. C.

United States Patent Office

PTO - BOYERS, PA Duty Station

MISSING PAGE TEMPORARY NOTICE

PATENT # 3442X FOR ISSUE DATE 1-29-1822

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

COLUMN # All text

Data Conversion Operation

Boyers, Pa